(12) United States Patent
Kubota et al.

(10) Patent No.: US 8,405,757 B2
(45) Date of Patent: Mar. 26, 2013

(54) IMAGING DEVICE

(75) Inventors: Yoji Kubota, Nagano (JP); Kenichi Kubota, Nagano (JP); Hitoshi Hirano, Nagano (JP)

(73) Assignee: Optical Logic Inc., Nagano (JP)

( * ) Notice: Subject to any disclaimer, the term of this patent is extended or adjusted under 35 U.S.C. 154(b) by 21 days.

(21) Appl. No.: 13/283,235

(22) Filed: Oct. 27, 2011

(65) Prior Publication Data

US 2012/0105705 A1 May 3, 2012

(30) Foreign Application Priority Data

Oct. 29, 2010 (JP) ................. 2010-243083

(51) Int. Cl.
*H04N 5/225* (2006.01)
*G02B 27/02* (2006.01)
*G06K 9/74* (2006.01)
*G06K 9/00* (2006.01)

(52) U.S. Cl. .......... 348/340; 359/798; 359/795; 356/71; 382/127

(58) Field of Classification Search .......... 348/77, 348/340; 356/71; 359/726, 793, 795, 798, 359/800; 382/124, 127
See application file for complete search history.

(56) References Cited

U.S. PATENT DOCUMENTS

| 5,629,764 | A | * | 5/1997 | Bahuguna et al. | 356/71 |
| 5,764,347 | A | * | 6/1998 | Podmaniczky et al. | 356/71 |
| 6,324,020 | B1 | * | 11/2001 | Teng et al. | 359/726 |
| 6,463,166 | B1 | * | 10/2002 | Fujiwara | 382/127 |
| 6,643,390 | B1 | * | 11/2003 | Clark et al. | 382/124 |
| 2012/0147168 | A1 | * | 6/2012 | Shin et al. | 348/77 |
| 2012/0275037 | A1 | * | 11/2012 | Kubota et al. | 359/753 |

FOREIGN PATENT DOCUMENTS

| JP | 55-013446 | 1/1980 |
| JP | 08-334691 | 12/1996 |

* cited by examiner

*Primary Examiner* — David N Spector
(74) *Attorney, Agent, or Firm* — Kubotera & Associates, LLC

(57) ABSTRACT

An imaging device includes a light source; a prism having an imaging surface to be contacted with an object; and an image-forming optical system that forms an image of the object. The image-forming optical system includes a front lens group having a first optical axis tilted relative to the imaging surface; an image plane tilted from a surface perpendicular to the first optical axis of the front lens group; and a rear lens group having a second optical axis shifted in parallel to the first optical axis of the front lens group. The image-forming optical system is arranged to satisfy the following conditional expression:

$|Aim|/(90°-Ain)<0.5$

Where Ain is an acute angle between the imaging surface and the first optical axis, and Aim is an angle between the image plane and a surface perpendicular to the first optical axis.

11 Claims, 12 Drawing Sheets

Lateral aberration

Lateral aberration

Lateral aberration

IMAGING DEVICE

BACKGROUND OF THE INVENTION AND RELATED ART STATEMENT

The present invention relates to an imaging device for forming an image on an image sensor such as a CCD sensor or a CMOS sensor. In particular, the present invention relates to an imaging device suitable for uses that obtain an image of an imaging surface tilted relative to an optical axis or an object contacting with the imaging surface.

In these years, public safety concerns and demands for higher security have been increased. Therefore, security technology to authenticate identities has attracted attentions. Among them, there is a long history of studies in fingerprint matching technologies to authenticate identities by comparing individuals' fingerprints obtained through imaging devices for fingerprint authentication with the fingerprints obtained in advance, and such technologies have been practically used. Since the fingerprint matching authentication has relatively high verification precision, it has been first introduced in fields, which require strictly-controlled confidentiality, such as in research organizations, banks, or large companies. Thereafter, with reduction of a price of the fingerprint matching related devices, the fingerprint authentication has been introduced also in smaller companies and general households for higher security upon logging in computers and networks, simplification of operation upon logging in, etc.

As a conventional imaging device for reading fingerprints, for example, there has been known an imaging device disclosed in Patent Reference 1. The conventional imaging device disclosed in Patent Reference 1 is configured being equipped with a light source, a right-angle prism, and a camera.

Patent Reference 1: Japanese Patent Application Publication No. 55-13446

When the conventional imaging device is used, a finger is put on a surface of the right-angle prism so as to have a bundle of rays from the light source enter the right-angle prism at a critical angle. When the bundle of rays enters the right-angle prism, a certain bundle of rays causes total reflection and another bundle of rays does not cause total reflection because of unevenness of a fingerprint. Then, a camera is provided for reading a pattern of the certain bundle of the rays that causes total reflection and the another bundle of the rays that does not cause total reflection, so that it is possible to obtain fingerprint information.

However, in the conventional imaging device for obtaining the fingerprint information using the right-angle prism, the prism surface to put a finger (imaging surface) is tilted relative to an optical axis of a camera lens. Accordingly, trapezoidal distortion or distortion may be generated. When the trapezoidal distortion or distortion is generated, it may cause lower matching precision.

To this end, Patent Reference 2 has disclosed another conventional imaging device as shown in FIG. 12. FIG. 12 is a schematic sectional view of a conventional imaging device. In the conventional imaging device disclosed in Patent Reference 2, a bilateral telecentric optical system 102 is provided between a right-angle prism 100 and an image sensor 101 for minimizing generation of the trapezoidal distortion or the distortion.

Patent Reference 2: Japanese Patent Application Publication No. 08-334691

According to the imaging device described in Patent Reference 2, it is possible to suitably control the trapezoidal distortion or the distortion caused by the right-angle prism. However, it is necessary to provide separately the telecentric optical system composed of a plurality of lenses, thereby making it difficult to reduce a size and a cost of the conventional imaging device.

Moreover, in these days, there has been also available a conventional fingerprint matching device that verifies the identity using fingerprints of four fingers from a pointing finger to a little finger so as to further enhance security. According to the fingerprint matching device, an imaging area to put a finger becomes larger, so that a prism and a telecentric optical system that compose the conventional imaging device unavoidably have to be large. Accordingly, it is necessary to increase a size and a manufacturing cost of the conventional imaging device.

As described above, when the conventional imaging device is used to capture an image of the imaging surface tilted relative to an optical axis or an object contacting with the imaging surface, the trapezoidal distortion or the distortion tends to occur, thereby causing the problems. For example, in order to monitor or capturing an image of a fabrication state of a workpiece placed on a table of a machine tool, it is prefer to provide the conventional imaging device such that the imaging device avoids a cutting tool such as a drill or an end mill disposed above the workpiece. However, the conventional imaging device captures an image of the workpiece in an oblique direction, thereby causing the trapezoidal distortion or the distortion.

In view of the above-described problems of the conventional imaging devices, an object of the present invention is to provide an imaging device having a small size. Accordingly, it is possible to capture an image with suitably corrected aberration even in a case that an imaging surface is tilted relative to an optical axis or an object contacts with such imaging surface.

SUMMARY OF THE INVENTION

In order to solve the above-described problems, according to a first aspect of the present invention, an imaging device includes a light source; a prism configured to totally reflect light from the light source on an imaging surface thereof contacting with an object having a pattern such as a fingerprint; and an image-forming optical system that forms an image of the object contacting with the imaging surface.

According to the first aspect of the present invention, the image-forming optical system includes a front lens group having an optical axis tilted relative to the imaging surface; a rear lens group that is provided closer to the image plane than the front lens group and disposed on an optical axis thereof horizontally shifted relative to or shifted in parallel to the optical axis of the front lens group; and an image plane provided being tilted from a surface perpendicular to the optical axis of the front lens group.

According to the first aspect of the present invention, the front lens group is configured to be a lens group having positive refractive power, and the rear lens group is configured to be a lens group having negative refractive power. When the imaging device has an acute angle Ain between the imaging surface and the optical axis of the front lens group, and an angle Aim between a surface perpendicular to the optical axis of the front lens group and the image plane, the imaging device satisfies the following conditional expression (1):

$$|Aim|/(90°-Ain)<0.5 \qquad (1)$$

According to the first aspect of the present invention, the optical axis of the front lens group is tilted relative to the imaging surface, the distance between the front lens group and the imaging surface may vary. More specifically, in case of the front lens group, although the distance from the optical axis is the same, there are two ranges, i.e., a range closer from the imaging surface (hereinafter referred to as a short-distance side) and a range far from the imaging surface (hereinafter referred to as a long-distance side). The distance difference from the imaging surface to the front lens group is one of causes to generate the trapezoidal distortion and the distortion.

According to the first aspect of the present invention, when the object has the pattern formed thereon such as a fingerprint, there are generated a bundle of rays that is totally reflected and a bundle of rays that is not totally reflected because of a surface unevenness of the pattern. The image-forming optical system forms an image on the image plane corresponding to patterns of the totally reflected bundle of rays and the non-totally reflected bundle of rays.

According to the first aspect of the present invention, in the image-forming optical system, the optical axis of the rear lens group having negative refractive power is horizontally shifted relative to or shifted in parallel to the front lens group having positive refractive power, and the image plane is provided being tilted from the surface perpendicular relative to the optical axis of the front lens group. Accordingly, it is possible to suitably correct the trapezoidal distortion and the distortion.

When the conditional expression (1) is satisfied, it is possible to restrain the trapezoidal distortion and the distortion within a satisfactory range while keeping respective conjugate relations between the long-distance side and the short-distance side in the image-forming optical system. When the value exceeds the range of the expression (1), the trapezoidal distortion and the distortion are excessively corrected, so that it is difficult to restrain the trapezoidal distortion and the distortion within satisfactory range. In the expression (1), an absolute value of the angle Aim is incorporated to include both a case that a direction of the angle Aim is clockwise (plus direction) and a case that a direction is counterclockwise (minus direction).

When the angle Ain is large, the distance difference from the imaging surface to the front lens group decreases, so that trapezoidal distortion and the distortion also decrease. In this case, without tilting the image plane from the surface perpendicular to the optical axis of the front lens group, it is possible to restrain the trapezoidal distortion and the distortion within a satisfactory range only with the front lens group and the rear lens group with the configurations described above. Therefore, the expression (1) is a conditional expression that includes a case of the configuration without tilting the image plane, i.e., the case where the angle Aim is zero.

According to a second aspect of the present invention, the imaging device with the configuration described above preferably further includes at least one mirror, which reflects output light from the prism so as to make the output light enter the front lens group, thereby further reducing a size of the imaging device.

According to the second aspect of the present invention, in the imaging device, the optical path of light output from the prism is bent by the mirror. Accordingly, it is possible to suitably reduce the size of the imaging device in comparison with the case without the mirror. It is preferred to have a plurality of mirrors, thereby further reducing the size of the imaging device.

According to a third aspect of the present invention, the imaging device to take an image of an imaging surface in an oblique direction is configured to include a front lens group having an optical axis tilted relative to the imaging surface; a rear lens group that is provided closer to the image plane than the front lens group and disposed on an optical axis thereof horizontally shifted relative to or shifted in parallel to the optical axis of the front lens group, and an image plane disposed being tilted from a surface perpendicular to the optical axis of the front lens group.

According to the third aspect of the present invention, the front lens group is configured to be a lens group having positive refractive power, and the rear lens group is configured to be a lens group having negative refractive power. When the imaging device has an acute angle Ain between the imaging surface and the optical axis of the front lens group, and an angle Aim between a surface perpendicular to the optical axis of the front lens group and an image plane, the imaging device is configured to satisfy the following conditional expression (1):

$$|Aim|/(90°-Ain)<0.5 \qquad (1)$$

As described above, when an image of the object is captured in the oblique direction, there is generated the trapezoidal distortion or the distortion. The imaging device is especially suitable in uses for taking the image of the object placed on the imaging surface in the oblique direction.

According to the third aspect of the present invention, in the image-forming optical system, the optical axis of the rear lens group having negative refractive power is horizontally shifted relative to or shifted in parallel to the optical axis of the front lens group having positive refractive power, and the image plane is provided being tilted from a surface perpendicular to the optical axis of the front lens group, so that the trapezoidal distortion and the distortion are suitably corrected. Moreover, when the expression (1) is satisfied, it is possible to restrain the trapezoidal distortion and the distortion within a satisfactory range while keeping respective conjugate relations between the long-distance side and the short-distance side in the image-forming optical system.

According to a fourth aspect of the present invention, in the imaging device having the above-described configuration, the front lens group preferably includes a first lens having a shape of a meniscus lens that directs a convex surface toward an object side and has positive refractive power; and a second lens having a shape of a meniscus lens that directs a concave surface toward the object side and has positive refractive power.

According to a fourth aspect of the present invention, when the first lens has the shape of the meniscus lens and the second lens has the shape of the meniscus lens so as to have their concave surfaces face each other, the spherical aberration and coma aberration are satisfactorily corrected and thereby it is possible to obtain satisfactory image-forming performance.

According to a fourth aspect of the present invention, in the imaging device having the above-described configuration, the rear lens group is preferably configured to include a third lens having a shape of a meniscus lens that directs a convex surface toward the object side and has negative refractive power; and a fourth lens having a shape of meniscus lens direction a convex surface toward the object side and has negative refractive power.

According to a fourth aspect of the present invention, the rear lens group is horizontally shifted relative to or shifted in parallel to the optical axis of the front lens group. Further, at least two lenses having shapes of meniscus lenses that direct their convex surfaces to the object side and have negative refractive power are provided along the optical axis. Accordingly, it is possible to satisfactorily correct the distortion and the chromatic aberration.

According to a fifth aspect of the present invention, in the imaging device having the above-described configuration, when the parallel eccentricity or a shifted amount between the optical axis of the front lens group and the optical axis of the rear lens group is DC and a focal length of the rear lens group is Fr, the imaging device preferably satisfies the following conditional expression (2):

$$-0.5 < DC/Fr < 0 \quad (2)$$

The expression (2) is a condition to restrain especially the trapezoidal distortion, rather than the distortion, within a more satisfactory range. When the value exceeds an upper limit of zero, the short-distance side distortion increases in the plus direction and the long-distance side distortion increases in the minus direction. Accordingly, the trapezoidal distortion increases, and it is difficult to restrain the trapezoidal distortion within a satisfactory range. On the other hand, when the value is below the lower limit of −0.5, the short-distance side distortion increases in the minus direction and the long-distance side distortion increases in the plus direction. Accordingly, the trapezoidal distortion increases, and it is difficult to restrain the trapezoidal distortion within a satisfactory range.

According to a sixth aspect of the present invention, in the imaging device having the above-described configuration, when a focal length of the front lens group is Ff and a focal length of the rear lens group is Fr, the imaging device preferably satisfies the following conditional expression (3):

$$-1.5 < Ff/Fr < -0.5 \quad (3)$$

The expression (3) is a condition to restrain the chromatic aberration within satisfactory range while restraining the trapezoidal distortion within the satisfactory range. When the value exceeds the upper limit of −0.5, the refractive power of the rear lens group becomes relatively smaller than that of the front lens group, and the chromatic aberration around the image plane is insufficiently corrected (a short wavelength increases in a minus direction in relative to the reference wavelength). Moreover, the long-distance side distortion increases in a minus direction and the trapezoidal distortion increases. For this reason, it is difficult to restrain the trapezoidal distortion within the satisfactory range.

On the other hand, when the value is below the lower limit of −1.5, the refractive power of the rear lens group becomes relatively higher than the refractive power of the front lens group, and the chromatic aberration around the image plane is excessively corrected (the short wavelength increases in a plus direction relative to the reference wavelength). Moreover, the distortion on the long-distance side increases in a plus direction and the trapezoidal distortion increases. Therefore, it is difficult to restrain the trapezoidal distortion within the satisfactory range.

According to the imaging device of the present invention, it is possible to provide the imaging device with the small size capable of suitably correcting the trapezoidal distortion or the distortion, which tends to be generated when the imaging device captures the image of the imaging surface tilted relative to the optical axis or the object contacting with the imaging surface.

DETAILED DESCRIPTION OF PREFERRED EMBODIMENTS

Hereunder, referring to the accompanying drawings, embodiments of the present invention will be fully described.

Figure 1:
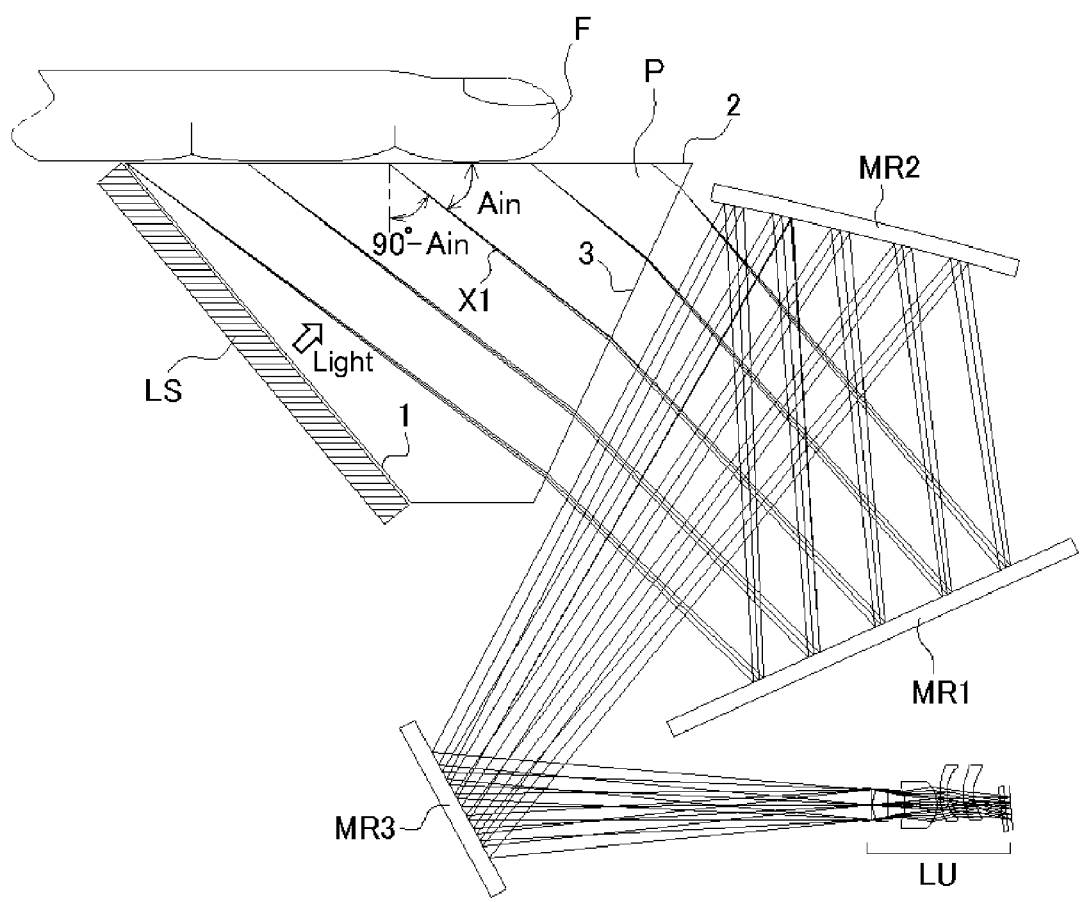
FIG. 1 is a schematic sectional view showing a configuration of an imaging device according to an embodiment of the present invention.

As shown in FIG. 1, the imaging device of this embodiment includes a light source LS; a prism P that light from the light source LS enters; and a first mirror MR1, a second mirror MR2, and a third mirror MR 3 to reflect the light output from the prism P; and an image-forming optical system LU to form an image of an object contacting with the prism P.

According to the embodiment, the prism P is a quadrangular prism (trapezoidal prism), and has an incident surface 1 for light from the light source LS to enter; an imaging surface 2 that contacts with an object having a pattern formed thereon such as a fingerprint of a finger F; and an outgoing surface 3 for the light entered from the light source LS in the prism P to outgo. Among them, the angle between the incident surface 1 and the imaging surface 2 is set so as to totally reflect the light entered from the incident surface 1 on the imaging surface 2. For this reason, the light entered from the light source LS in the incident surface 1 outgoes from the outgoing surface 3 after total reflection on the imaging surface 2.

The light source LS is disposed so that a light-emitting surface of the light surface LS faces the incident surface 1 of the prism P. Such light source LS may be preferably the one that can provide uniform brightness on the light-emitting surface. For example, such light source LS can be a rectangular LED lighting system equipped with a light guide panel. In case of such light source LS, by having the area of the light-emitting surface the same as the area of the incident surface 1 of the prism P, it is possible to efficiently emit the light into the prism P.

The first mirror MR1, the second mirror MR2, and the third mirror MR3 are disposed so as to reflect the outgoing light from the prism P and have the outgoing light enter the image-forming optical system LU. For this reason, the outgoing light from the prism P is successively reflected by the first mirror MR1 through the third mirror MR3 and then enters the image-forming optical system LU. Therefore, light path of the outgoing light from the prism P is bent by the first mirror MR1 through the third mirror MR3, it is possible to reduce the size of the imaging device in comparison with the one not equipped with mirrors. Here, the number of the mirrors may be suitably selected depending on the required size of the imaging device. For example, the imaging device can be configured to include one or two mirrors so as to reflect the outgoing light from the prism P, or to include at least 4 mirrors to reflect the outgoing light from the prism P.

Figure 2:
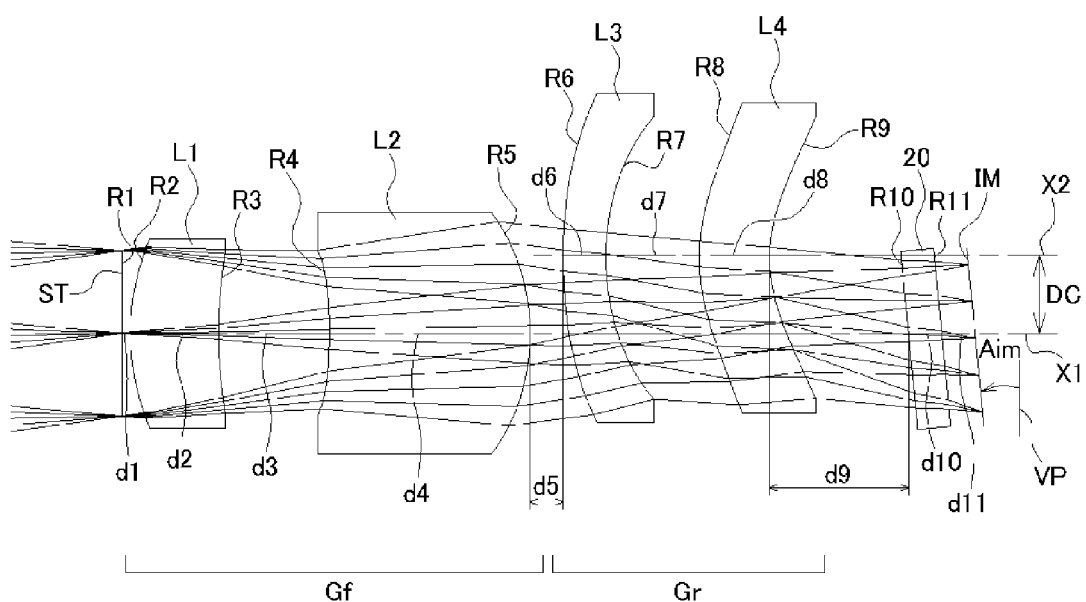
FIG. 2 is a schematic sectional view showing a configuration of an image-forming optical system of the imaging device in Numerical Data Example 1 according to the embodiment of the present invention.
Figure 5:
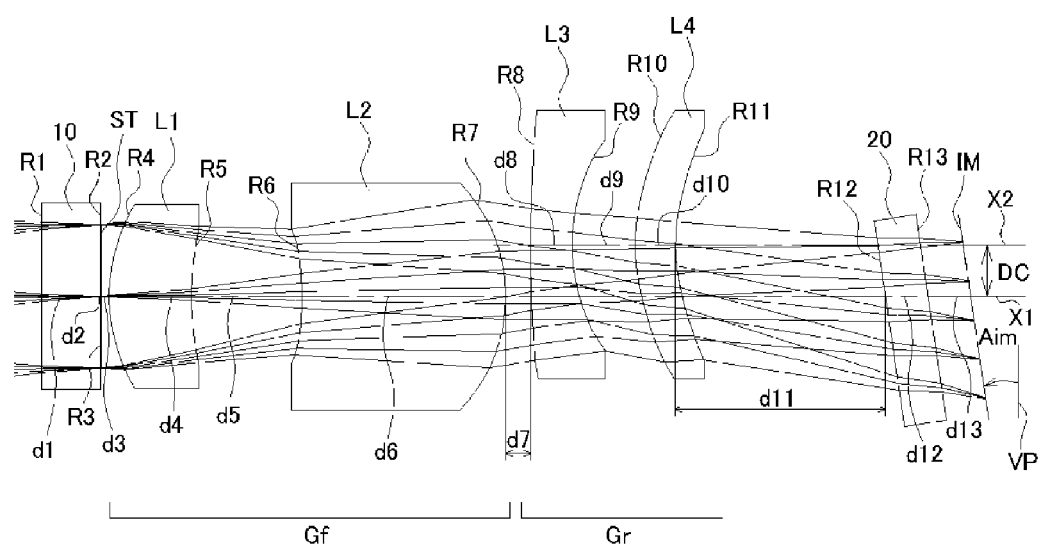
FIG. 5 is a schematic sectional view showing of a configuration of an image-forming optical system of the imaging device in Numerical Data Example 2 according to the embodiment of the present invention.
Figure 8:
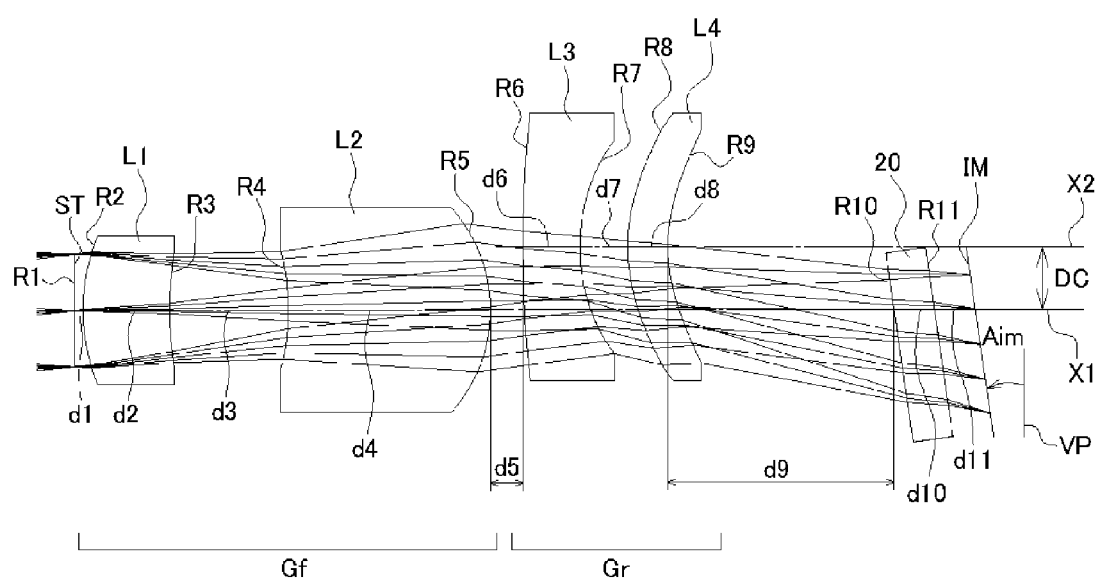
FIG. 8 is a schematic sectional view showing a configuration of an image-forming optical system of the imaging device in Numerical Data Example 3 according to the embodiment of the present invention.

Next, the image-forming optical system LU will be described. FIG. 2, FIG. 5, and FIG. 8 are sectional views of lenses in the image-forming optical system LU in Numerical Data Examples 1 to 3 of the imaging device according to the embodiment. Since a basic lens configuration is the same among the Numerical Data Examples, the lens configuration of the embodiment will be described with reference to the lens sectional view of the image-forming optical system LU in Numerical Data Example 1.

As shown in FIG. 2, the image-forming optical system LU includes a front lens group Gf having positive refractive power; a rear lens group Gr that is disposed closer to an image plane side than the front lens group Gf and has negative refractive power; and an image plane IM disposed being tilted for an angle Aim from a surface VP perpendicular to an optical axis X1 of the front lens group Gf, ordered in this order from the object side (prism P side). Here, according to this embodiment, a filter 20 such as a cover glass is provided between the rear lens group Gr and the image plane IM.

In the image-forming optical system LU, the optical axis X1 of the front lens group Gf is titled for an angle Ain in relative to the imaging surface 2 of the prism P. More specifically, the image-forming optical system LU is disposed to take an image of the imaging surface 2 from an oblique direction. On the other hand, the rear lens group Gr is disposed on an optical axis X2 that is horizontally shifted relative to or shifted in parallel to the optical axis X1 of the front lens group Gf.

The front lens group Gf includes a first lens L1 having a shape of a meniscus lens that directs its convex surface to an object side and has positive refractive power; and a second lens L2 having a shape of a meniscus lens that directs its concave surface to the object side and has positive refractive power. According to the embodiment, the front lens group Gf is configured to include only two lenses, the first lens L1 and the second lens L2. The number of lenses to compose the front lens group Gf is not limited to two. Any number of lenses may be used as long as the refractive power of the front lens group Gf is positive and the front lens group Gf may be configured to include three or more lenses.

The rear lens group Gr includes a third lens L3 having a shape of a meniscus lens that directs a convex surface to the object side and has negative refractive power; and a fourth lens L4 having a shape of a meniscus lens that directs a convex surface to the object side and has negative refractive power. In the imaging device according to this embodiment, the rear lens group Gr is configured to include only two lenses, the third lens L3 and the fourth lens L4. For this reason, the total number of lenses that compose the image-forming optical system LU can be very small like four and thereby it is possible to suitably miniaturize the imaging device. Here, the number of lenses that compose the rear lens group Gr is also not limited to two. It can be any as long as the refractive power of the rear lens group Gr is negative, and it is possible to configure the rear lens group Gr using three or more lenses.

According to this embodiment, any of the lenses, the first lens L1 to the fourth lens L4, has a lens surface that is formed to be an aspheric surface. When the aspheric surface applied to the lens surfaces have an axis Z in directions of optical axes X1 and X2, a height H in a direction perpendicular to the optical axis X1 or X2, a conical coefficient k, and aspheric coefficients $A_4$, $A_6$, $A_8$, $A_{10}$, $A_{12}$, and $A_{14}$, the aspheric surfaces of the lens surfaces may be expressed as follows:

$$Z = \frac{\frac{H^2}{R}}{1+\sqrt{1-(k+1)\frac{H^2}{R^2}}} + A_4 H^4 + A_6 H^6 + A_8 H^8 + A_{10} H^{10} + A_{12} H^{12} + A_{14} + H^{14} \quad \text{[Formula 1]}$$

When the imaging device of the embodiment has an acute angle Ain between the imaging surface 2 of the prism P and the optical axis X1 of the front lens group Gf, an angle Aim between a surface VP perpendicular to the optical axis X1 of the front lens group Gf and the image plane IM, a parallel eccentricity or a shifted amount DC between the optical axis X1 and the optical axis X2 of the rear lens group Gr, a focal length Fr of the rear lens group Gr, and a focal length Ff of the front lens group Gf, the imaging device satisfies the following respective conditional expressions (1) to (3):

$$|Aim|/(90°-Ain)<0.5 \quad (1)$$

$$-0.5<DC/Fr<0 \quad (2)$$

$$-1.5<Ff/Fr<-0.5 \quad (3)$$

In the embodiment, it is not necessary to satisfy all of the conditional expressions, and, when any single one of the conditional expressions is individually satisfied, it is possible to obtain an effect corresponding to the respective conditional expression.

Next, Numerical Data Examples 1-3 of the embodiment will be described. Since a basic configuration of the imaging device is the same among the Numerical Data Examples, only Numerical Data Example of the image-forming optical system LU is described here. In each of the Numerical Data Examples, i represents a surface number counted from the object side, R represents a curvature radius, d represents a distance between lens surfaces (surface spacing) on the optical axis X1 or X2, Nd represents a refractive index for a d line, and vd represents Abbe's number for the d line, respectively. Here, aspheric surfaces are indicated with surface numbers i affixed with * (asterisk).

Numerical Data Example 1

Basic lens data are shown below.

| Unit: mm | | | |
|---|---|---|---|
| Surface Data | | | |
| Surface Number i | R | d | Nd | vd |
|---|---|---|---|---|
| 1 (Stop) | ∞ | 0.2000 | | |
| 2* | 5.512 | 2.1200 | 1.53110 | 56.0 |
| 3* | 8.876 | 2.6800 | | |
| 4* | −14.111 | 4.8500 | 1.53110 | 56.0 |
| 5* | −5.454 | 0.8000 | | |
| 6* | 12.640 | 1.0300 | 1.53110 | 56.0 |
| 7* | 6.109 | 2.2500 | | |

-continued

Unit: mm

| | | | | |
|---|---|---|---|---|
| 8* | 4.484 | 1.7000 | 1.53110 | 56.0 |
| 9* | 3.577 | 3.3837 | | |
| 10 | ∞ | 0.8000 | 1.51633 | 64.2 |
| 11 | ∞ | 0.8000 | | |
| (Image Plane IM) | ∞ | | | |

Aspheric Surface Data

Second Surface $k = 0.000000, A_4 = -7.090858E-04, A_6 = 7.174103E-06,$
$A_8 = -1.871088E-05, A_{10} = 1.299564E-07$
Third Surface $k = 0.000000, A_4 = -2.402803E-03, A_6 = -7.216804E-05,$
$A_8 = -6.927408E-05, A_{10} = 6.503475E-06,$
$A_{12} = -1.469196E-06, A_{14} = 1.801888E-07$
Fourth Surface $k = -2.311386E+01, A_4 = -5.820063E-03, A_6 = -8.313413E-04,$
$A_8 = 1.319570E-04, A_{10} = -2.949755E-05$
Fifth Surface $k = 4.405647E-02, A_4 = -9.754898E-04, A_6 = -7.101622E-06,$
$A_8 = -2.830326E-06, A_{10} = 3.102667E-08$
Sixth Surface $k = 0.000000, A_4 = 8.118341E-04, A_6 = -6.948994E-06,$
$A_8 = 3.992795E-07, A_{10} = -1.471636E-08$
Seventh Surface $k = 0.000000, A_4 = 1.484118E-04, A_6 = 7.748787E-05,$
$A_8 = -2.252509E-06, A_{10} = 9.263760E-08$
Eighth Surface $k = -3.058164, A_4 = -9.881137E-04, A_6 = -1.651112E-05,$
$A_8 = 1.120288E-06, A_{10} = 1.908430E-08$
Ninth Surface $k = -2.287264, A_4 = -1.567276E-03, A_6 = 1.029212E-05,$
$A_8 = -3.190465E-07, A_{10} = 1.494118E-08$ Angle Aim = −5.50°
Angle Ain = 42.00°
Parallel Eccentricity DC = 1.820 mm
Ff = 11.824
Fr = −16.387

The values of the conditional expressions (1) to (3) are shown below:

$|Aim|/(90°-Ain)=0.115$ (1)

$DC/Fr=-0.111$ (2)

$Ff/Fr=-0.722$ (3)

Therefore, the imaging device in Numerical Data Example 1 satisfies the respective expressions.

FIG. 2 shows field curvature (mm), distortion (mm), and distortion (grid), respectively, of the imaging device in Numerical Data Example 1. The graphs of field curvature (mm) and distortion (mm) show aberrations at each wavelength, 525 nm, 505 nm, and 545 nm, respectively, and among them, the graph of field curvature respectively shows aberrations on a sagittal image surface S and aberrations on a tangential image surface T (which will be the same in FIGS. 6 and 9). As shown in those graphs, according to the imaging device in Numerical Data Example 1, the image surface is satisfactorily corrected, and distortion is fully restrained. In addition, as shown in the graph of distortion (grid), the trapezoidal distortion is also satisfactorily restrained.

Figure 3:
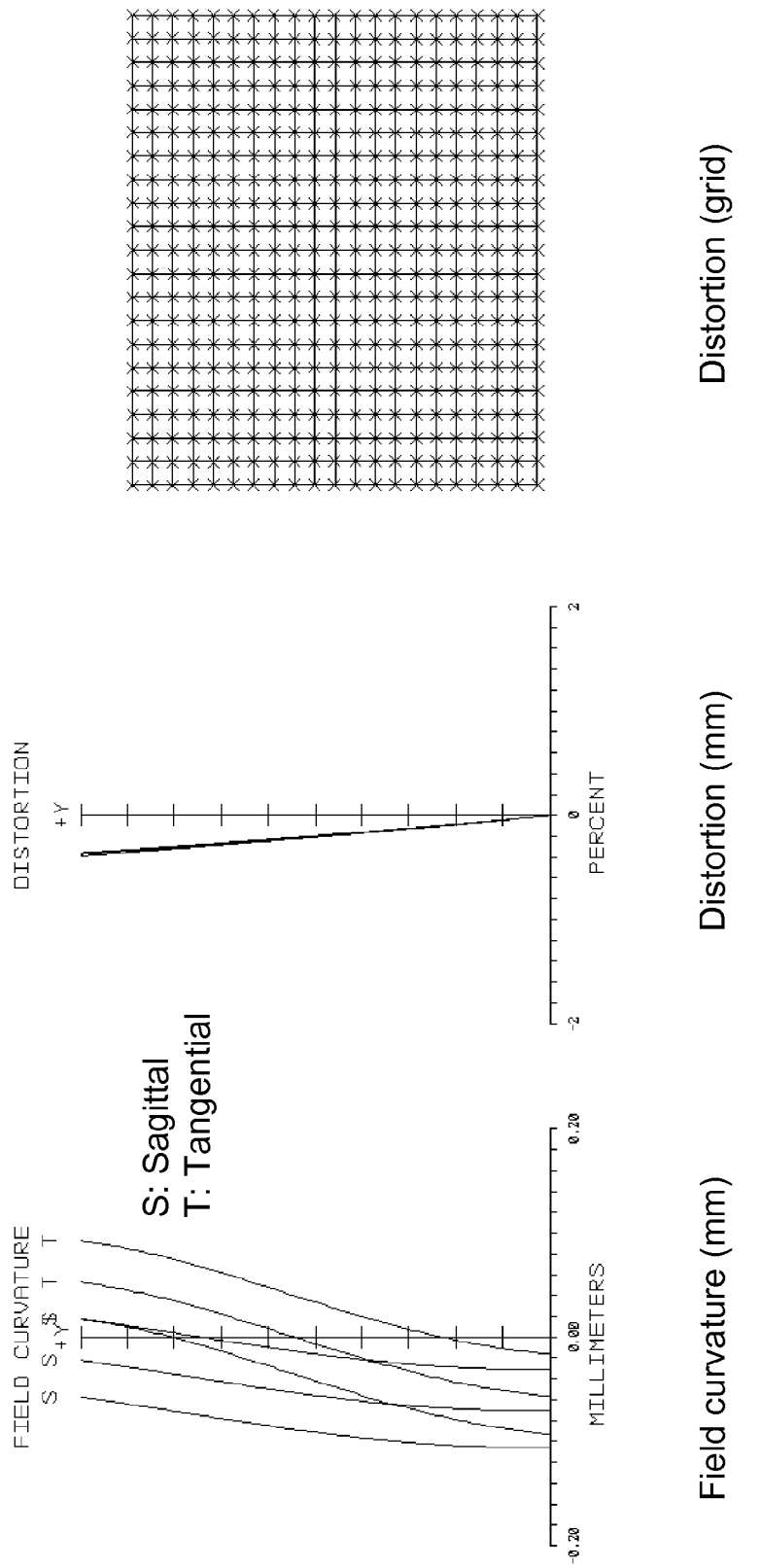
FIG. 3 is an aberration diagram showing a field curvature, a distortion, and the distortion (on a grid) of the imaging device in Numerical Data Example 1 according to the embodiment of the present invention.
Figure 4:
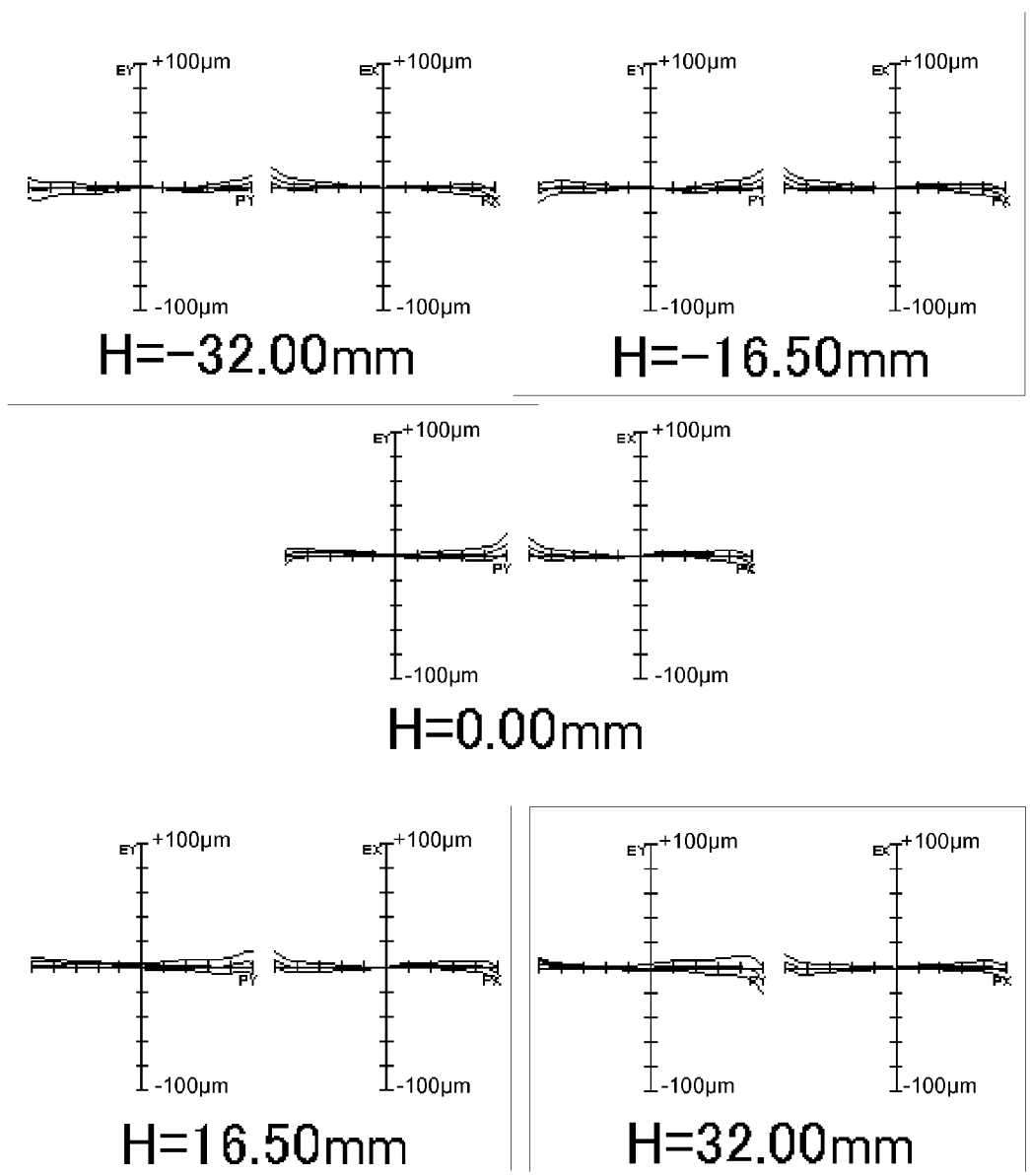
FIG. 4 is an aberration diagram showing a lateral aberration of the imaging device in Numerical Data Example 1 according to the embodiment of the present invention.

FIG. 3 respectively shows lateral aberrations for the object-side image heights H. As shown in FIG. 3, according to the imaging device in Numerical Data Example 1, the spherical aberrations, coma aberrations, and chromatic aberrations are satisfactorily corrected at respective image heights H.

Numerical Data Example 2

As shown in FIG. 5, the image-forming optical system LU of the imaging device in Numerical Data Example 2 is configured to have a filter 10 on the object side of the stop T, which is different from the image-forming optical system LU in the aforementioned Numerical Data Example 1.

Basic lens data are shown below.

Unit: mm

Surface Data

| Surface Number i | R | d | Nd | vd |
|---|---|---|---|---|
| 1 | ∞ | 0.7000 | 1.51633 | 64.2 |
| 2 | ∞ | 0.0000 | | |
| 3 (Stop) | ∞ | 0.1000 | | |
| 4* | 2.038 | 0.9727 | 1.53110 | 56.0 |
| 5* | 3.201 | 1.3034 | | |
| 6* | −4.817 | 2.4149 | 1.53110 | 56.0 |
| 7* | −2.041 | 0.3000 | | |
| 8* | 27.397 | 0.4886 | 1.53110 | 56.0 |
| 9* | 2.351 | 0.7448 | | |
| 10* | 2.280 | 0.4750 | 1.53110 | 56.0 |
| 11* | 2.115 | 2.5504 | | |
| 12 | ∞ | 0.5000 | 1.51633 | 64.2 |
| 13 | ∞ | 0.5000 | | |
| (Image Plane IM) | ∞ | | | |

Aspheric Surface Data

Fourth Surface $k = 0.000000, A_4 = -1.600234E-02, A_6 = 1.206398E-02,$
$A_8 = -9.808370E-03, A_{10} = -2.691835E-03$
Fifth Surface $k = 0.000000, A_4 = -4.481754E-02, A_6 = 2.082648E-02,$
$A_8 = -4.698799E-02, A_{10} = 1.098268E-02$
Sixth Surface $k = 1.024256, A_4 = -9.363852E-02, A_6 = -4.320789E-02,$
$A_8 = -1.803430E-02, A_{10} = -5.178195E-02$
Seventh Surface $k = -4.882773E-02, A_4 = -1.250939E-02, A_6 = 8.384593E-04,$
$A_8 = -1.375502E-03, A_{10} = 3.240322E-04$
Eighth Surface $k = 0.000000, A_4 = 6.400492E-03, A_6 = -1.387417E-03,$
$A_8 = 5.951644E-04, A_{10} = -1.338315E-04$
Ninth Surface $k = 0.000000, A_4 = 6.903218E-03, A_6 = 1.512814E-03,$
$A_8 = 3.887076E-03, A_{10} = -2.952696E-03,$
$A_{12} = 7.586315E-04$
Tenth Surface $k = -5.586240, A_4 = -1.888317E-03, A_6 = 7.625348E-03,$
$A_8 = -2.139146E-03, A_{10} = 4.385274E-04$
Eleventh Surface $k = -7.696572, A_4 = 1.413051E-02, A_6 = -3.041405E-03,$
$A_8 = 6.325475E-05, A_{10} = 2.570634E-04$ Angle Aim = −8.36°
Angle Ain = 42.00°
Parallel Eccentricity DC = 0.608 mm
Ff = 4.881
Fr = −4.489

The values of the conditional expressions (1) to (3) are shown below:

$$|Aim|/(90°-Ain)=0.174 \qquad (1)$$

$$DC/Fr=-0.135 \qquad (2)$$

$$Ff/Fr=-1.087 \qquad (3)$$

Therefore, the imaging device in Numerical Data Example 2 satisfies the respective expressions.

Figure 6:
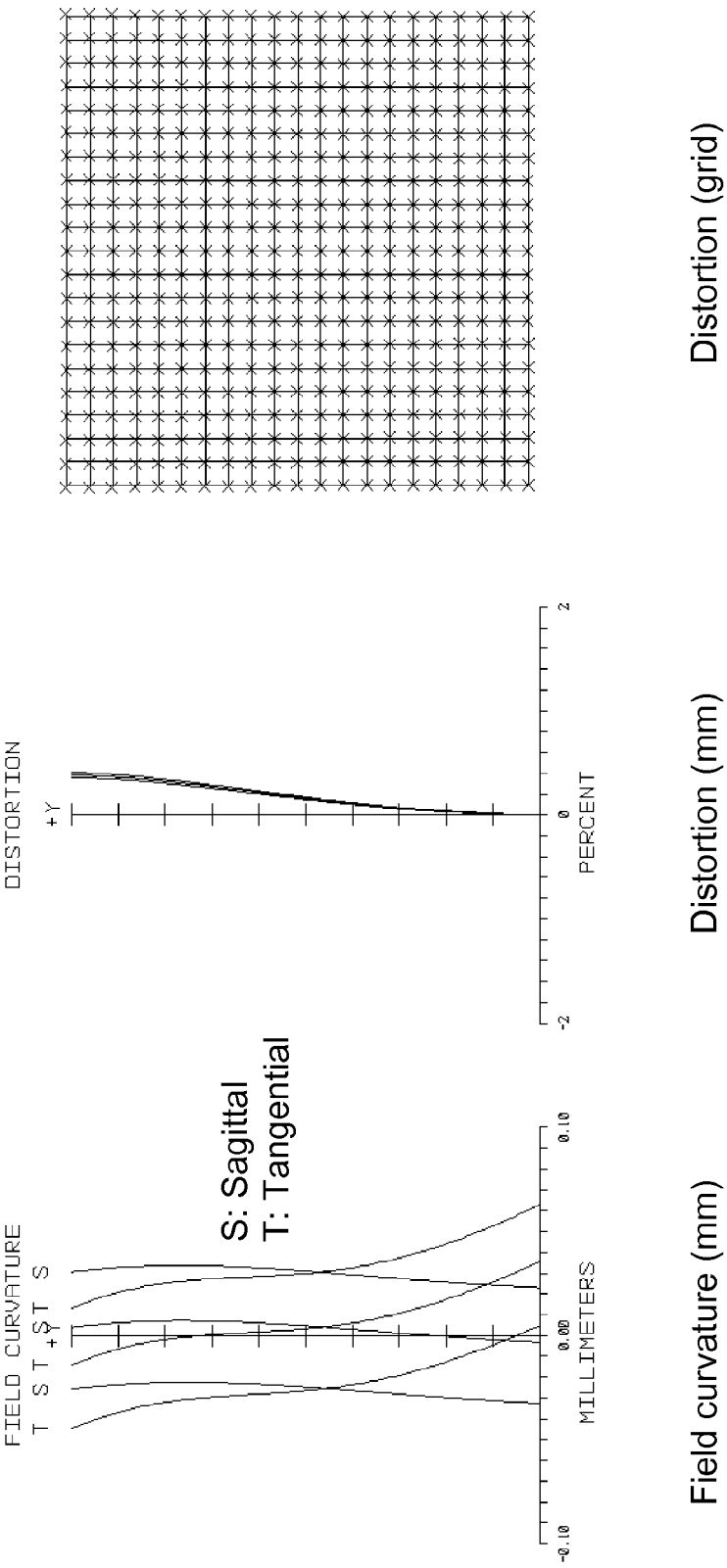
FIG. 6 is an aberration diagram showing the field curvature, the distortion, and the distortion (on the grid) of the imaging device in Numerical Data Example 2 according to the embodiment of the present invention.
Figure 7:
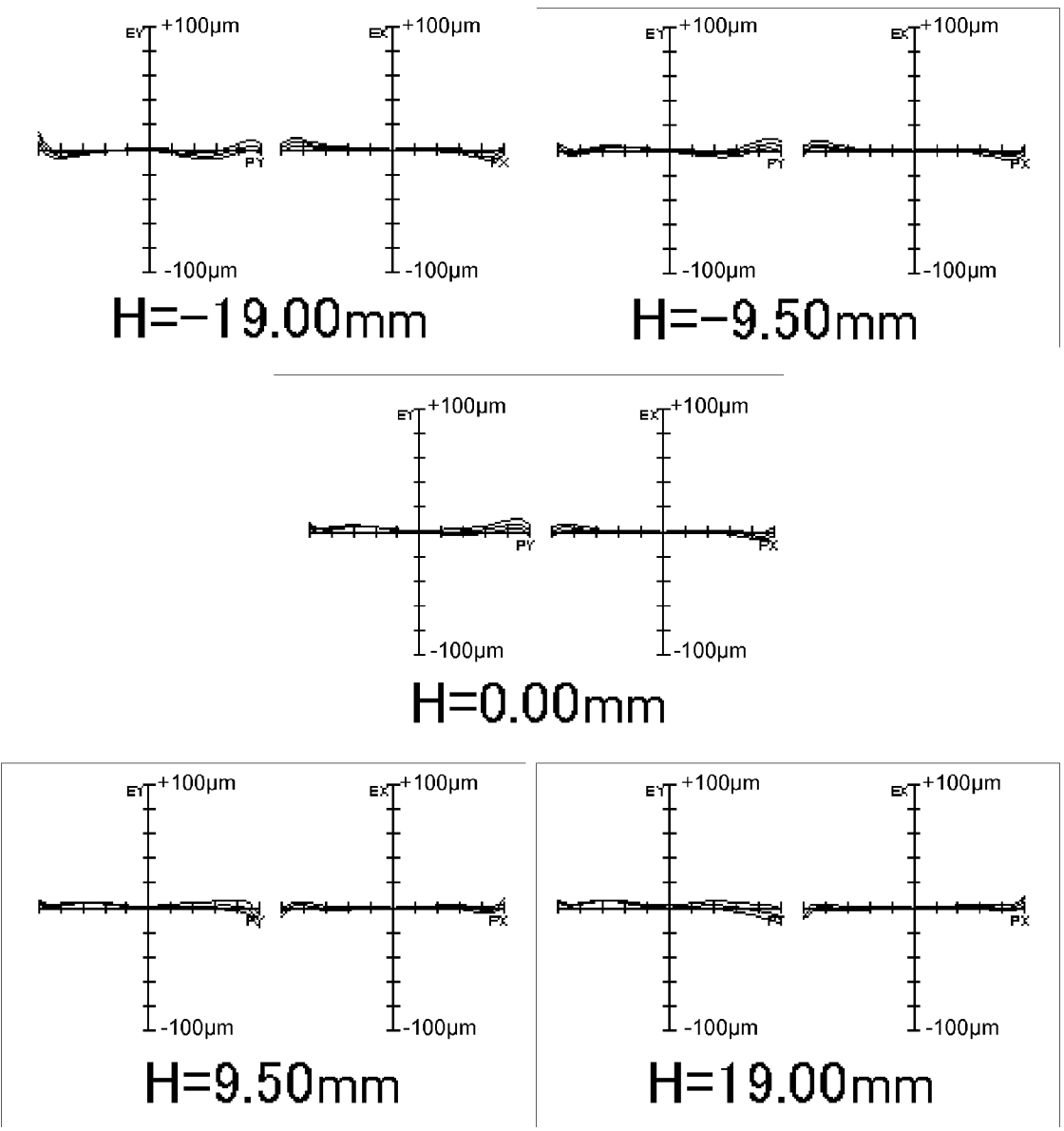
FIG. 7 is an aberration diagram showing the lateral aberration of the imaging device in Numerical Data Example 2 according to the embodiment of the present invention.

FIG. 6 shows a field curvature (mm), distortion (mm), and distortion (grid), respectively, of the imaging device in Numerical Data Example 2. FIG. 7 shows a lateral aberration for an object-side image height H. As shown in FIGS. 6 and 7, according to the imaging device in Numerical Data Example 2, similarly to the imaging device in Numerical Data Example 1, generation of the distortion and trapezoidal distortion is fully restrained and the spherical aberration, coma aberration, and chromatic aberration are satisfactorily corrected at respective image heights H.

Numerical Data Example 3

Basic lens data are shown below.

Unit: mm

Surface Data

| Surface Number i | R | d | Nd | vd |
|---|---|---|---|---|
| 1 (Stop) | ∞ | 0.1000 | | |
| 2* | 2.371 | 1.0740 | 1.53110 | 56.0 |
| 3* | 3.708 | 1.4725 | | |
| 4* | −4.753 | 2.5146 | 1.53110 | 56.0 |
| 5* | −1.979 | 0.4104 | | |
| 6* | 25.701 | 0.7046 | 1.53110 | 56.0 |
| 7* | 2.415 | 0.5931 | | |
| 8* | 2.226 | 0.4996 | 1.53110 | 56.0 |
| 9* | 2.089 | 2.8953 | | |
| 10 | ∞ | 0.5000 | 1.51633 | 64.2 |
| 11 | ∞ | 0.5000 | | |
| (Image Plane IM) | ∞ | | | |

Aspheric Surface Data

Second Surface $k = 0.000000, A_4 = -1.150179E-02, A_6 = -1.867157E-03,$
$A_8 = -7.509999E-03, A_{10} = 9.170910E-04$
Third Surface $k = 0.000000, A_4 = -3.638407E-02, A_6 = -1.367707E-02,$
$A_8 = -4.575058E-02, A_{10} = 2.927077E-02$
Fourth Surface $k = -7.260863E-02, A_4 = -9.711058E-02, A_6 = -6.582867E-02,$
$A_8 = 3.447382E-02, A_{10} = -8.521492E-02$
Fifth Surface $k = -7.196639E-02, A_4 = -9.686672E-03, A_6 = -4.557380E-04,$
$A_8 = -2.846377E-04, A_{10} = 1.738286E-04$
Sixth Surface $k = 0.000000, A_4 = 6.969001E-03, A_6 = -8.730551E-04,$
$A_8 = -2.606181E-05, A_{10} = 8.403836E-06$
Seventh Surface $k = 0.000000, A_4 = 5.796045E-03, A_6 = 3.819821E-03,$
$A_8 = -4.767972E-04, A_{10} = -5.105318E-05$ -continued Unit: mm Eighth Surface $k = -2.703439, A_4 = 1.531497E-03, A_6 = 2.645925E-04,$
$A_8 = 8.309945E-05, A_{10} = -1.381777E-08$
Ninth Surface $k = -2.638993, A_4 = -1.374842E-03, A_6 = -6.446677E-04,$
$A_8 = -1.354604E-04, A_{10} = 3.082649E-05$ Angle Aim = −8.14°
Angle Ain = 45.00°
Parallel Eccentricity DC = 0.776 mm
Ff = 4.976
Fr = −4.753

The values of the conditional expressions (1) to (3) are shown below:

$$|Aim|/(90°-Ain)=0.181 \qquad (1)$$

$$DC/Fr=-0.163 \qquad (2)$$

$$Ff/Fr=-1.047 \qquad (3)$$

Therefore, the imaging device in Numerical Data Example 3 satisfies the respective expressions.

Figure 9:
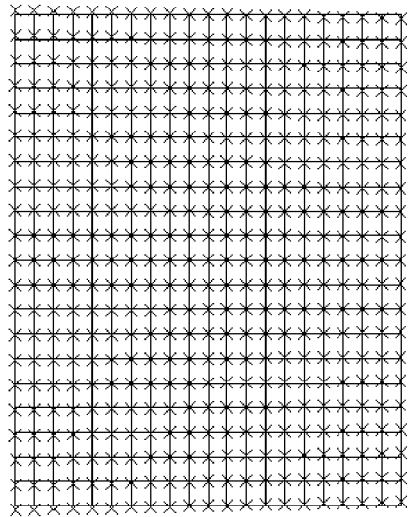
FIG. 9 is an aberration diagram showing the field curvature, the distortion, and the distortion (on the grid) of the imaging device in Numerical Data Example 3 according to the embodiment of the present invention.
Figure 9:
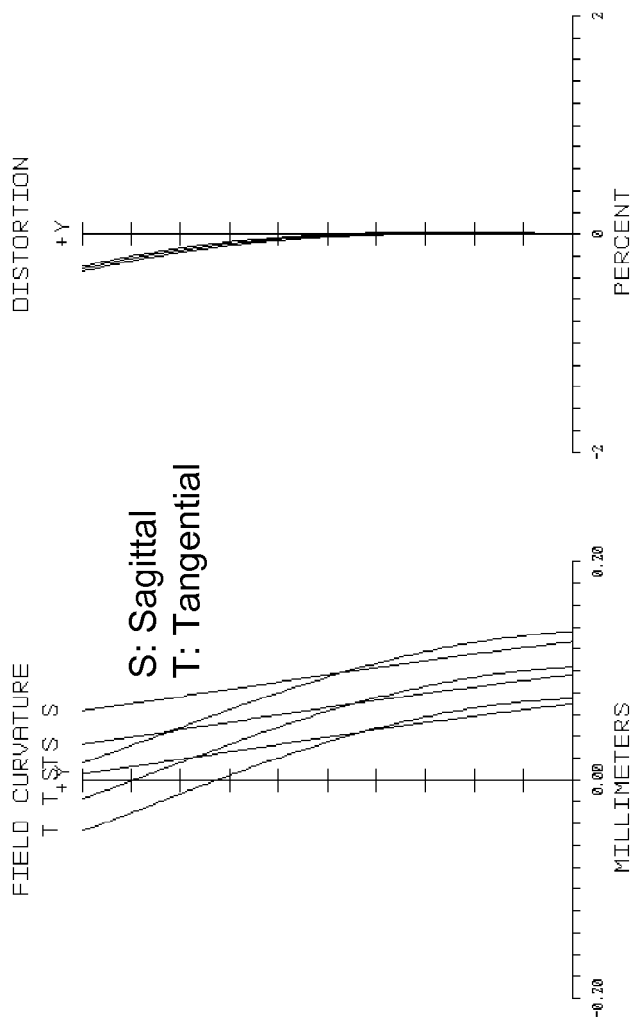
Figure 10:
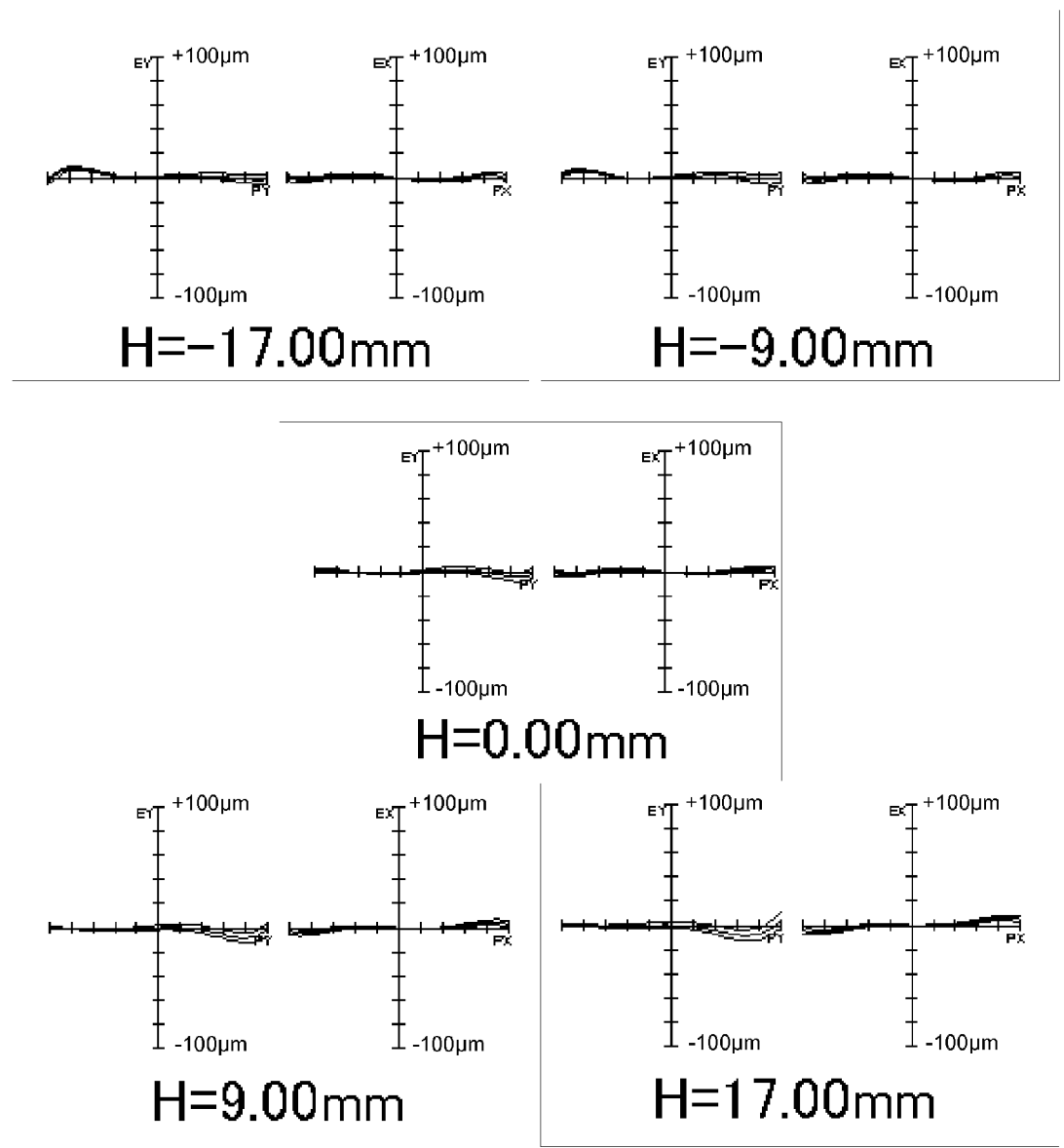
FIG. 10 is an aberration diagram showing the lateral aberration of the imaging device in Numerical Data Example 3 according to the embodiment of the present invention.

FIG. 9 shows a field curvature (mm), distortion (mm), and distortion (grid), respectively, of the imaging device in Numerical Data Example 3. FIG. 10 shows a lateral aberration for an object-side image height H.

As shown in FIGS. 9 and 10, according to the imaging device in Numerical Data Example 3, generation of the distortion and trapezoidal distortion is fully restrained and the spherical aberration, coma aberration, and chromatic aberration are satisfactorily corrected at respective image heights H, similarly to the imaging device in Numerical Data Example 1.

Therefore, when the imaging device of the embodiment is applied on an imaging device for fingerprint reading, although the imaging surface is tilted relative to the optical axis, it is possible to obtain a satisfactory image with satisfactorily corrected trapezoidal distortion, distortion, or the like and with less aberration and distortion.

Figure 11:
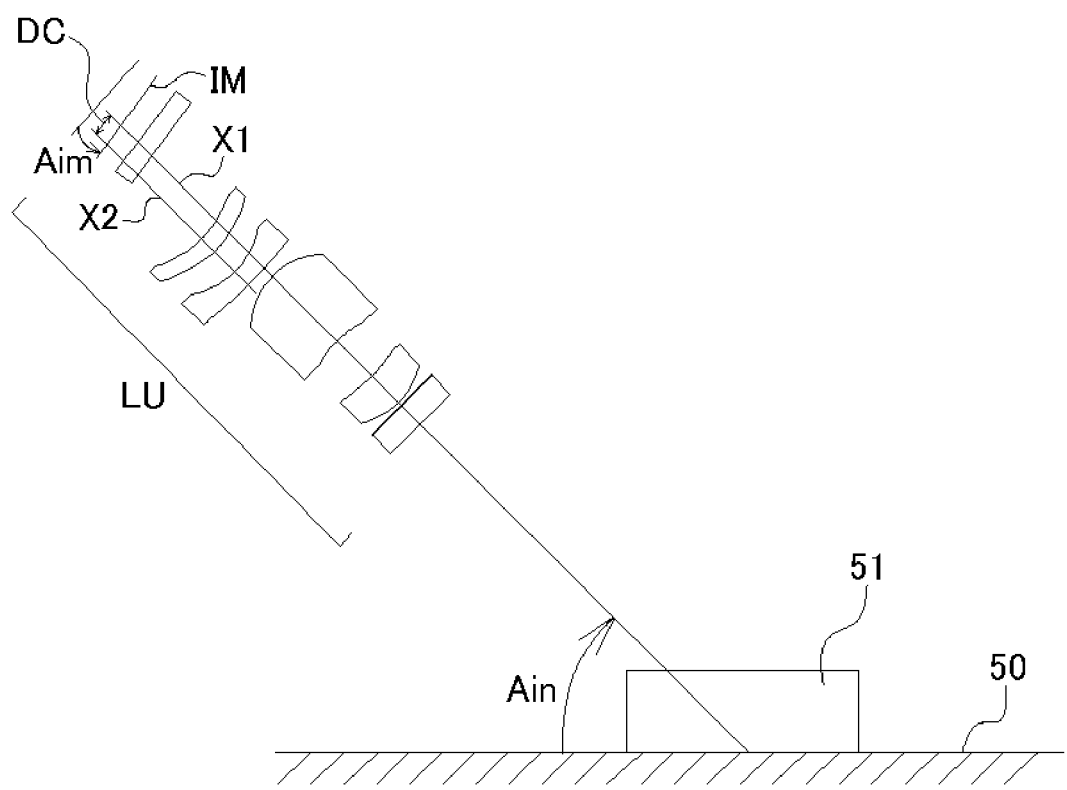
FIG. 11 is a schematic view showing a configuration of an imaging device according to another embodiment of the present invention.
Figure 12:
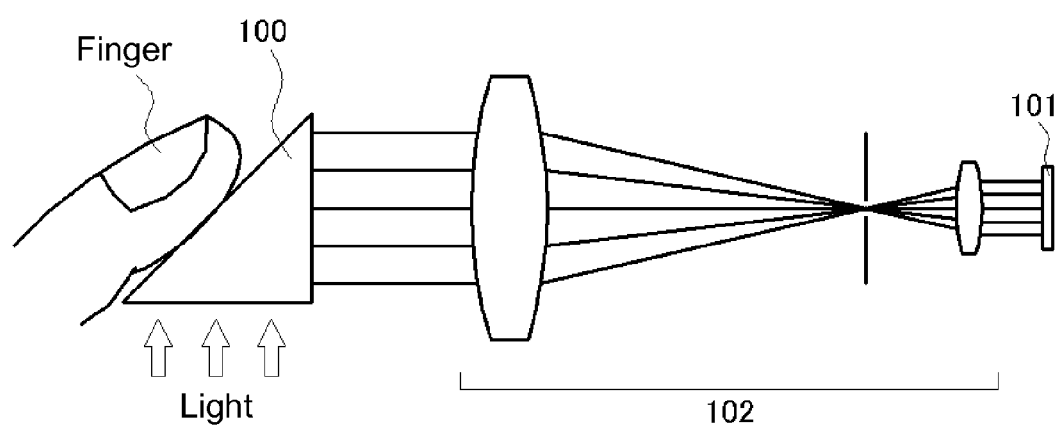
FIG. 12 is a schematic sectional view of a conventional imaging device.

Here, the present invention may not be limited to the above-described embodiment. For example, as shown in FIG. 11, the present invention may be applied in uses such as taking an image of an imaging surface 50 such as a table of a machine tool or measurement table, or an object 51, which is placed on the imaging surface 50, obliquely.

Even when being applied in those uses, the imaging device has a basic configuration similar to that of the above-described embodiment. More specifically, as shown in FIG. 11, the imaging device includes the image-forming optical system LU disposed to take an image of an imaging surface 50 or of an object 51 in an oblique direction. Similarly to the above-described embodiment, the image-forming optical system LU includes a front lens group having the optical axis X1 tilted relative to the imaging surface 50; and a rear lens group that is provided closer to the image plane side than the front lens group and is disposed on the optical axis X2 that is horizontally shifted relative to or shifted in parallel to the optical axis X1 of the front lens group. Here, the front lens group has positive refractive power and the rear lens group has negative refractive power. Furthermore, the image plane IM is disposed being tilted from a surface VP that is perpendicular to the optical axis X1 of the front lens group.

Even in the imaging device having the above-described configuration, similarly to the previously described embodiment, when the imaging device of the embodiment has an acute angle Ain between the imaging surface 50 and the optical axis X1 of the front lens group, an angle Aim between a surface VP perpendicular to the optical axis X1 of the front lens group and the image plane IM, parallel eccentricity DC between the optical axis X1 and the optical axis X2 of the rear lens group, a focal length Fr of the rear lens group, and a focal length Ff of the front lens group, the imaging device preferably satisfies the following respective conditional expressions:

$$|Aim|/(90°-Ain)<0.5 \quad (1)$$

$$-0.5<DC/Fr<0 \quad (2)$$

$$-1.5<Ff/Fr<-0.5 \quad (3)$$

When being applied in those uses, it is possible to obtain an image with fully restrained trapezoidal distortion and distortion that are generated by taking an image of the imaging surface 50 or the abject 50 in an oblique direction and with satisfactorily corrected spherical aberration, coma aberration, and chromatic aberration.

The present invention can be applied in an imaging device to obtain an image of an imaging surface tilted relative to an optical axis or of an object contacting with such imaging surface, for example, an imaging device for fingerprint reading.

The disclosure of Japanese Patent Application No. 2010-243083, filed on Oct. 29, 2010, is incorporated in the application by reference.

While the invention has been explained with reference to the specific embodiments of the invention, the explanation is illustrative and the invention is limited only by the appended claims.

What is claimed is:

1. An imaging device comprising:
   a light source that emits light;
   a prism having an imaging surface to be contacted with an object having a pattern formed thereon so that the light from the light source totally reflects on the imaging surface; and
   an image-forming optical system that forms an image of the object,
   wherein said image-forming optical system comprises:
   a front lens group having a first optical axis tilted relative to the imaging surface, said front lens group having positive refractive power;
   an image plane tilted from a surface perpendicular to the first optical axis of the front lens group; and
   a rear lens group disposed on a side of the image plane relative to the front lens group and having a second optical axis shifted in parallel to the first optical axis of the front lens group, said rear lens group having negative refractive power, and
   said image-forming optical system is arranged to satisfy the following conditional expression:

$$|Aim|/(90°-Ain)<0.5$$

where Ain is an acute angle between the imaging surface and the first optical axis of the front lens group, and Aim is an angle between the image plane and a surface perpendicular to the first optical axis of the front lens group.

2. The imaging device according to claim 1, further comprising at least one mirror arranged to reflect the light from the prism so that the light enters the front lens group.

3. The imaging device according to claim 1, wherein said front lens group includes a first lens formed in a meniscus shape and having a convex surface that directs toward the object, said first lens having positive refractive power, and a second lens formed in a meniscus shape and having a concave surface that directs toward the object, said second lens having positive refractive power.

4. The imaging device according to claim 1, wherein said rear lens group includes a third lens formed in a meniscus shape and having a convex surface that directs toward the object, said third lens having negative refractive power, and a fourth lens formed in a meniscus shape and having a convex surface that directs toward the object, said fourth lens having negative refractive power.

5. The imaging device according to claim 1, wherein said image-forming optical system is arranged to satisfy the following expression:

$$-0.5<DC/Fr<0$$

where DC is a shifted amount between the first optical axis and the second optical axis, and Fr is a focal length of the rear lens group.

6. The imaging device according to claim 1, wherein said image-forming optical system is arranged to satisfy the following expression:

$$-1.5<Ff/Fr<-0.5$$

where Ff is a focal length of the front lens group and Fr is a focal length of the rear lens group.

7. An imaging device that captures an image of an imaging surface in an oblique direction, comprising:
   a front lens group having a first optical axis tilted relative to the imaging surface, said front lens group having positive refractive power;
   an image plane tilted from a surface perpendicular to the first optical axis of the front lens group; and
   a rear lens group disposed on a side of the image plane relative to the front lens group and having a second optical axis shifted in parallel to the first optical axis of the front lens group, said rear lens group having negative refractive power, and
   said image-forming optical system is arranged to satisfy the following conditional expression:

$$|Aim|/(90°-Ain)<0.5$$

where Ain is an acute angle between the imaging surface and the first optical axis of the front lens group, and Aim is an angle between the image plane and a surface perpendicular to the first optical axis of the front lens group.

8. The imaging device according to claim 7, wherein said front lens group includes a first lens formed in a meniscus shape and having a convex surface that directs toward an object on the imaging surface, said first lens having positive refractive power, and a second lens formed in a meniscus shape and having a concave surface that directs toward the object, said second lens having positive refractive power.

9. The imaging device according to claim 7, wherein said rear lens group includes a third lens formed in a meniscus shape and having a convex surface that directs toward an object on the imaging surface, said third lens having negative refractive power, and a fourth lens formed in a meniscus shape and having a convex surface that directs toward the object, said fourth lens having negative refractive power.

10. The imaging device according to claim 7, wherein said image-forming optical system is arranged to satisfy the following expression:

$$-0.5<DC/Fr<0$$

where DC is a shifted amount between the first optical axis and the second optical axis, and Fr is a focal length of the rear lens group.

11. The imaging device according to claim 7, wherein said image-forming optical system is arranged to satisfy the following expression:

$$-1.5<Ff/Fr<-0.5$$

where Ff is a focal length of the front lens group and Fr is a focal length of the rear lens group.

* * * * *